United States Patent

[11] 3,548,940

[72] Inventors Ernesto J. Reguera
Pasadena;
Joseph T. Carlin, Houston; Joseph C. Allen,
Bellaire, Tex.
[21] Appl. No. 786,792
[22] Filed Sept. 30, 1968
[45] Patented Dec. 22, 1970
[73] Assignee Texaco Inc.
New York, N.Y.
a corporation of Delaware

[54] METHOD FOR RECOVERY OF HYDROCARBONS FROM A SUBTERRANEAN FORMATION PREVIOUSLY PRODUCED BY SOLUTION GAS DRIVE
2 Claims, No Drawings

[52] U.S. Cl. .................................................. 166/273
[51] Int. Cl. ......................................................... E21b 43/20
[50] Field of Search ............................................ 166/273, 274

[56] References Cited
UNITED STATES PATENTS

| | | | |
|---|---|---|---|
| 2,609,051 | 9/1952 | Brownscombe............. | 166/274 |
| 2,623,596 | 12/1952 | Whorton et al.............. | 166/274 |
| 2,669,307 | 2/1954 | Mulholland et al.......... | 166/274 |
| 3,065,790 | 11/1962 | Holm............................ | 166/274 |
| 3,251,411 | 5/1966 | Holm............................ | 166/273 |

OTHER REFERENCES

Uren, Lester C. Petroleum Production Engineering: Oil Field Exploitation. NY, McGraw-Hill, 3D Ed., 1953. pp. 54—57, 64, 65.

*Primary Examiner*—Marvin A. Champion
*Assistant Examiner*—Ian A. Calvert
*Attorneys*—K. E. Kavanagh and Thomas H. Whaley ABSTRACT: In a subterranean hydrocarbon-bearing formation which previously has undergone a solution gas drive and in which a free gas saturation has been established, improved recovery of hydrocarbons is effected by the injection of a gas to maintain the free gas saturation at a pressure level necessary for water flooding the formation, followed by a water flood of the repressured formation.

METHOD FOR RECOVERY OF HYDROCARBONS FROM A SUBTERRANEAN FORMATION PREVIOUSLY PRODUCED BY SOLUTION GAS DRIVE

FIELD OF THE INVENTION

This invention relates to an improved method for the recovery of hydrocarbons from a subterranean hydrocarbon-bearing formation which previously has undergone a solution gas drive, by repressuring the formation by the injection of a gas wherein the free gas saturation, which was established during the solution gas drive, is maintained at the anticipated pressure level necessary for a water flood, followed by water injection at the pressure of the formation, resulting in further hydrocarbon recovery from the formation.

DESCRIPTION OF THE PRIOR ART

Primary production of hydrocarbons from a subterranean hydrocarbon-bearing formation normally is obtained by allowing the energy of the formation contained therein to drive the hydrocarbons from the formation to the surface through one or more production wells. The energy of the formation may exist in the form of water drive, gas cap, or solution gas drive or combinations thereof. These various forms of energy provide the driving force necessary for the production of hydrocarbons from subterranean hydrocarbon-bearing formations without the necessity of providing energy from an external source.

A gas drive reservoir is one in which the major source of energy being used to drive the hydrocarbons toward a production well is associated with the gas dissolved in the hydrocarbons or in a free gas zone which may exist in the formation. If there is no gas cap initially, the producing mechanism is termed a solution gas drive. As long as the pressure within the formation is at a sufficiently high level, this gas remains in solution with the hydrocarbons. However, as the production is continued by solution gas drive, the pressure within the formation declines. When the pressure has declined to the point where bubbles of free gas commence to come out of solution, which is known as the "bubble point", the formation develops what is referred to as a condition of free gas saturation, wherein there exists within the formation, in both the minor and major flow channels, a quantity of free gas. As the free gas saturation is increased, the evolved bubbles coalesce and form a continuous gas phase. At this point, gas permeability exists and free gas flows through the formation with little or no displacement of hydrocarbon.

In order to obtain additional recovery, it is common practice to undertake a secondary recovery operation at the time when the pressure of the formation has decreased to a level indicative that the energy within the formation has been substantially expended. One common method used as a secondary recovery process is that of water flooding whereby water is injected into the formation through one or more injection wells and forced toward the production wells thereby resulting in displacing hydrocarbons toward the production wells and resulting in additional hydrocarbon recovery. In order to effect a flood, the injection of the water must necessarily be conducted at a pressure greater than the pressure of the formation. This pressure, which can be calculated by known techniques, depends upon the formation characteristics such as permeability and porosity, overburden limitations, and equipment limitations.

Processes for the still further recovery of hydrocarbons after a water-flood operation have been proposed which involve the repressuring of the formation by gas injection after a water flood, followed by pressure depletion of the formation whereby the formation is produced without further fluid injection. Other proposals for obtaining further hydrocarbon recovery have included the repressuring of the formation with water. However, the repressuring of the formation by water injection eliminates most of the free gas saturation which may have been established during the solution gas drive with the result that the realized recovery is less than that which would be obtained from water floods performed in the presence of a free gas saturation.

We have found that if an initial gas saturation is established prior to water flooding of a reservoir, greater ultimate recoveries may be realized than that obtained if the water flood is conducted without free gas present.

Accordingly, it is an object of the present invention to provide an improved process for recovering hydrocarbons from a subterranean hydrocarbon-bearing formation by repressuring the formation by the injection of gas to maintain a free gas saturation at the expected water injection pressure, prior to conducting a water flood operation, which is then conducted at the newly established pressure level of the formation.

SUMMARY

This invention comprises a method for the additional recovery of hydrocarbons from a subterranean hydrocarbon-bearing formation, which previously has been produced by solution gas drive, by repressuring the formation to maintain a free gas saturation at the expected water injection pressure prior to undergoing a subsequent water flood.

DESCRIPTION OF THE PREFERRED EMBODIMENT

The results of experimental work have shown that greater ultimate recovery is obtained when water flooding is conducted in the presence of a free gas saturation. More particularly, increased recovery is obtained when the free gas saturation has been established by solution gas drive, rather than by external gas drive.

The amount of trapped gas within the interstices of the formation increases with the amount of free gas present at the start of the water flood and is dependent upon the mechanism by which the initial gas saturation is established.

It is postulated that when a free gas saturation within a formation is established through the mechanism of solution gas drive as contrasted with external gas drive, the gas is more uniformly distributed throughout the interstices of the formation. The result of the more uniform distribution of the free gas, is that a gas saturation is established not only in the major channels of the formation, from which the gas is more likely to be displaced by water, but also a gas saturation is established within the minor pore channels. This trapped gas occupies pore volume that otherwise would be occupied by hydrocarbons, thereby reducing the hydrocarbon saturation. Consequently, when water is injected subsequently, in the presence of a free gas saturation, additional hydrocarbon recovery is realized as a result of the prior establishment of the uniformly distributed free gas saturation.

Illustrative of this invention, a series of laboratory experiments was performed which demonstrated that greater recovery of hydrocarbons could be obtained by establishing a free gas saturation at the required pressure level for water flooding, prior to undertaking the water flood. The experiments consisted of: (1) water flooding at the bubble point pressure of the system; (2) water flooding at the abandonment pressure of the solution gas drive of the reservoir; (3) repressuring of the system by gas injection followed by water flooding at the repressurization pressure.

The experiments were conducted using two dolomite cores, which were machined and suitably mounted in high pressure flood pots. The cores were obtained from the Glorieta formation, which had been produced by fluid expansion from the discovery pressure of 2400 p.s.i.g. to the bubble point pressure of 340 p.s.i.g. and by solution gas drive to the abandonment pressure of 100 p.s.i.g.

In each core an initial water saturation was established, to simulate the water saturation of the actual formation, after which the remaining pore volume was filled with a hydrocarbon laboratory model fluid, whose properties were similar to the properties of the hydrocarbons of the actual formation. The initial pressure was 300 p.s.i.a. and the initial oil saturation was approximately 65 percent. For the experiments, all fluid injection and depletion rates were 18 ml./hr.

The experimental conditions and the results are shown in the following table.

establish an effective gas saturation even after the water flood had been initiated, if the conditions of the reservoir are such

| Run No. | | Oil saturation after depletion, percent | Repressure mechanism by fluid injection | Oil saturation after water flood, percent | Cumulative recovery, percent |
|---|---|---|---|---|---|
| G1-1 | Water flood at bubble point pressure of 300 p.s.i.a. | | | 44.4 | 31.6 |
| G1-2 | Pressure depletion from 300 p.s.i.a. to 90 p.s.i.a.; repressure to 800 p.s.i.a. by water injection; water flood at 800 p.s.i.a. | 42.1 | Water | 38.4 | 36.7 |
| G1-3 | Pressure depletion from 300 p.s.i.a. to 90 p.s.i.a.; repressure to 800 p.s.i.a. by nitrogen injection; water flood at 800 p.s.i.a. | 43.1 | Nitrogen | 36.3 | 41.8 |
| G2-1 | Water flood at bubble point pressure of 300 p.s.i.a. | | | 38.0 | 42.8 |
| G2-2a | Pressure depletion from 300 p.s.i.a. to 90 p.s.i.a.; repressure to 800 p.s.i.a. by water injection; water flood at 800 p.s.i.a. | 43.4 | Water | 38.4 | 40.2 |
| G2-2b | do | 44.2 | do | 35.5 | 44.2 |
| G2-3a | Pressure depletion from 300 p.s.i.a. to 90 p.s.i.a.; repressure to 800 p.s.i.a. by nitrogen injection; water flood at 800 p.s.i.a. | 43.2 | Nitrogen | 29.4 | 53.7 |
| G2-3b | do | 44.0 | do | 29.7 | 53.4 |
| G2-3c | Pressure depletion from 300 p.s.i.a. to 90 p.s.i.a.; repressure to 800 p.s.i.a. by methane-ethane mixture; water flood at 800 p.s.i.a. | 44.9 | Methane-ethane | 29.7 | 53.6 |

The results showed that the hydrocarbon recovery for water floods performed at the bubble point pressure was 31.6 percent in Run No. G1-1 and 42.8 percent in Run No. G2-1. In the runs in which pressure depletion was followed by repressurization using water as the repressuring agent, the hydrocarbon recovery was 36.7 percent in Run G1-2 and 40.2 percent in Run G2-2a, which represent an increase in recovery of approximately 16 percent over Run G1-2, while in Run G2-2a, the recovery was essentially the same as for the reference water flood at the bubble point pressure. In both cores, the gas saturation was eliminated essentially by water repressuring.

In the runs in which nitrogen was used as the repressuring agent, an average trapped gas saturation of 13 percent was retained by the cores. The results showed that a hydrocarbon recovery of 41.8 percent was obtained in Run G1-3 and 44.2 percent in Run G2-2b which represents an increased recovery of 32 percent and 25 percent respectively over that obtained in the reference water floods.

In the run G2-3c, in which a methane-ethane gas mixture was used to repressure the core, the additional recovery obtained over that of the reference water flood at the bubble point pressure was 25 percent, but the trapped gas saturation was decreased.

An additional experiment (not tabled) was performed in which, after the water flood at 800 p.s.i.a., the core was depleted to atmospheric pressure to reestablish a gas saturation. The core was repressured to 800 p.s.i.a. by nitrogen and then water flooded. A trapped gas saturation of 16 percent was retained after the water flood, resulting in additional oil recovery. Though the excessive water throughput would not be desirable, establishing a gas saturation by pressure depletion could be effective even though water flooding had already started.

From the results, it can be seen that the maintenance of a free gas saturation after a solution gas drive resulted in the improved recovery of from about 13.0 percent to about 34.0 percent of the hydrocarbons present in the cores as compared to a reference water flood. The process of the invention thus permits the recovery of significant quantities of hydrocarbons which could not be recovered by ordinary waterflooding and gas driving techniques.

Repressuring a depleted reservoir by gas injection to a pressure as high as or higher than the water flood pressure effectively retained the trapped gas saturation and resulted in an increased oil recovery, while repressuring by water injection eliminated the gas saturation and reduced the hydrocarbon recovery. The results showed also that it is possible to that a solution gas drive can be performed.

A suggested procedure as applied to a subterranean hydrocarbon-bearing formation which previously has undergone a solution gas drive and has been repressured by injecting a gas into the formation for a sufficient time to repressure the formation to the pressure level required for a water flood and thereafter has been produced by a water flood, would comprise the following steps:

a. terminate the injection of water;
b. deplete the pressure in the formation and produce hydrocarbons by solution gas drive;
c. inject a gas into the formation for a sufficient time to repressure the formation to a pressure lever necessary for water flooding; and
d. inject water into the formation through the injection well and produce hydrocarbons through the production wells until the water-oil ratio again reaches an undesirably high level.

The subject disclosure could use any gas for repressuring the formation, as, for example, air, natural gas, combustion flue gas, nitrogen, carbon dioxide, methane, or mixtures thereof.

We claim:

1. In a method of recovering hydrocarbons from a subterranean hydrocarbon-bearing formation, said formation being penetrated by at least one injection well and at least one production well and having been previously produced by solution gas drive and having been repressured by injecting gas to increase the pressure on said formation to at least that required for water flooding and thereafter said formation being waterflooded at said increased formation pressure, the improvement comprising:

a. ceasing injecting water into said formation via said injection well;
b. recovering hydrocarbons via said production well by solution gas drive;
c. injecting gas into said formation via said injection well until the pressure on said formation has reached at least that of the water injection pressure;
d. injecting water into said formation via said injection well to displace additional hydrocarbons from said formation toward said production well; and
e. recovering additional hydrocarbons via said production well.

2. The method of claim 1 wherein the injection gas contains at least one member selected from the group consisting of air, combustion flue gas, natural gas, methane, nitrogen, carbon dioxide and mixtures thereof.